(12) United States Patent
Han et al.

(10) Patent No.: US 8,483,242 B2
(45) Date of Patent: Jul. 9, 2013

(54) METHOD AND APPARATUS FOR PROCESSING INTER-RAT MEASUREMENT IN DUAL MODEM DEVICE

(75) Inventors: Mun Yong Han, Anyang-si (KR); Jae Cheon Kim, Anyang-si (KR); Il Hwan Kim, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 12/943,661

(22) Filed: Nov. 10, 2010

(65) Prior Publication Data

US 2011/0110256 A1 May 12, 2011

Related U.S. Application Data

(60) Provisional application No. 61/260,013, filed on Nov. 11, 2009.

(30) Foreign Application Priority Data

Jul. 14, 2010 (KR) ........................ 10-2010-0067855

(51) Int. Cl.
*H04J 3/06* (2006.01)
(52) U.S. Cl.
USPC .......................................... 370/503; 375/354

(58) Field of Classification Search
USPC .................. 370/252, 503, 507, 509; 375/354, 375/356
See application file for complete search history.

(56) References Cited

U.S. PATENT DOCUMENTS

2005/0043046 A1* 2/2005 Lee ............................... 455/502
2009/0191862 A1* 7/2009 Amirijoo et al. ............... 455/424

* cited by examiner

*Primary Examiner* — Kerri Rose
(74) *Attorney, Agent, or Firm* — Birch, Stewart, Kolasch & Birch, LLP

(57) ABSTRACT

A method and apparatus for processing inter-RAT measurement in a dual modem device are disclosed. A method for processing inter-RAT measurement in a dual modem device includes receiving, by a first processor communicating with a first communication network, a measurement control signal including a parameter for signal measurement from the first communication network; transmitting, by the first processor, timing information based on a system frame number (SFN) and a global time to a second processor; acquiring time synchronization for the inter-RAT measurement between the first processor and the second processor on the basis of the system frame number (SFN) and the global time; transmitting the parameter from the first processor to the second processor; and measuring, by the second processor, a signal of a second communication network using the parameter.

10 Claims, 5 Drawing Sheets

METHOD AND APPARATUS FOR PROCESSING INTER-RAT MEASUREMENT IN DUAL MODEM DEVICE

This application claims the benefit of the U.S. Provisional Patent Application No. 61/260,013, filed on Nov. 11, 2009 and the Korean Patent Application No. 10-2010-0067855, filed on Jul. 14, 2010, which is hereby incorporated by reference as if fully set forth herein.

BACKGROUND OF THE INVENTION

1. Field of the Invention

The present invention relates to a dual modem device, and more particularly to a method and apparatus for processing inter-RAT measurement in a dual modem device.

2. Discussion of the Related Art

Wireless mobile communication technology is being rapidly developed not only for voice communication but also for high-speed transmission/reception of data. Nowadays, a fourth generation mobile communication technology, for example, a Long Term Evolution (LTE) wireless communication system is a focus of attention. However, when a fourth generation communication network and a third generation communication network coexist, a mobile communication terminal or a mobile communication data card must include not only fourth generation mobile communication technology but also third generation mobile communication technology, which is still highly prevalent globally. Therefore, in order to simultaneously support next generation mobile communication technology and legacy mobile communication technology, a mobile communication terminal having a dual modem processor and a data-card type device (hereinafter referred to as a dual modem device) are needed.

The dual modem device includes two modems having different communication schemes so as to support different communication schemes using the two modems. Generally, the dual modem devices have been widely used in a region including heterogeneous communication networks. As representative examples of the dual modem device, a Long Term Evolution (LTE) wireless communication device and a Code Divisional Multiple Access (CDMA) communication device are being intensively researched by many developers and companies. Although the present invention will exemplarily disclose such a dual modem device capable of communicating with both LTE and CDMA networks, the scope or spirit of the present invention is not limited thereto and can also be applied to other wireless communication systems as necessary.

SUMMARY OF THE INVENTION

Accordingly, the present invention is directed to a method and apparatus for processing inter-RAT measurement in a dual modem device that substantially obviate one or more problems due to limitations and disadvantages of the related art.

An object of the present invention is to provide a method and apparatus for processing inter-RAT measurement in a dual modem device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing inter-RAT measurement in a dual modem device includes receiving, by a first processor communicating with a first communication network, a measurement control signal including a parameter for signal measurement from the first communication network; transmitting, by the first processor, timing information based on a system frame number (SFN) and a global time to a second processor; acquiring time synchronization for the inter-RAT measurement between the first processor and the second processor on the basis of the system frame number (SFN) and the global time; transmitting the parameter from the first processor to the second processor; and measuring, by the second processor, a signal of a second communication network using the parameter.

The method may further include transmitting a periodic signal for correcting time synchronization from the first processor to the second processor. The measuring of the signal may include calculating a timing synchronization offset between the first processor and the second processor using at least one of the timing information based on the global time, the system frame number (SFN), and the periodic signal; and correcting time synchronization between the first processor and the second processor using the timing synchronization offset.

The first processor may transmit a periodic signal for correcting time synchronization until the inter-RAT measurement is completed. The first processor may stop transmitting and receiving data to and from the first communication network until the inter-RAT measurement is completed.

In another aspect of the present invention, a dual modem device includes a first processor communicating with a first communication network; and a second processor communicating with a second communication network. The first processor receives a measurement control signal including a parameter for signal measurement from the first communication network, and transmits timing information based on a system frame number and a global time, and the second processor acquires time synchronization for inter-RAT measurement between the first processor and the second processor on the basis of the system frame number (SFN) and the global time, and measures a signal of the second communication network using the parameter upon receiving the parameter from the first processor.

The first processor may transmit a periodic signal for correcting time synchronization to the second processor. The second processor may calculate a timing synchronization offset between the first processor and the second processor using at least one of the timing information based on the global time, the system frame number (SFN), and the periodic signal, and correct time synchronization between the first processor and the second processor using the timing synchronization offset.

The first processor may transmit a periodic signal for correcting time synchronization until the inter-RAT measurement is completed. The first processor may stop transmitting and receiving data to and from the first communication network until the inter-RAT measurement is completed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a 3GPP LTE mobile communication system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in block diagram form on the basis of the important functions of the present invention. Wherever possible, the same reference numbers will be used throughout the drawings to refer to the same or like parts.

In the following description, a terminal or device may refer to a mobile or fixed user equipment (UE), for example, a user equipment (UE), a mobile station (MS) and the like. Also, the base station (BS) may refer to an arbitrary node of a network end which communicates with the above terminal or device, and may include a Node B (Node-B), an eNode B (eNode-B), and an access point (AP) and the like.

Figure 1:
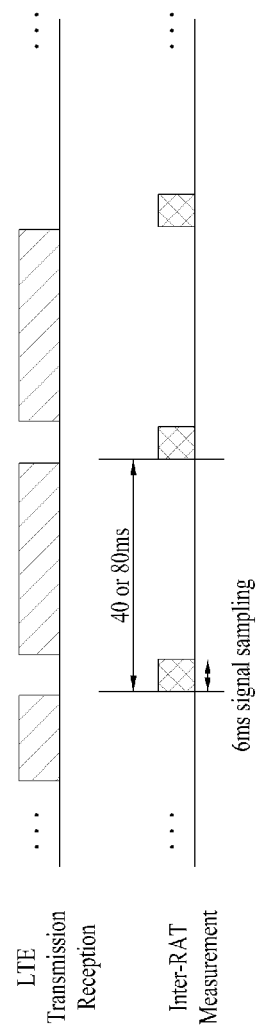
FIG. 1 is a conceptual diagram illustrating inter-RAT measurement.

FIG. 1 is a conceptual diagram illustrating inter-RAT measurement.

Referring to FIG. 1, if a user equipment (UE) (also called a mobile station MS) communicating with the LTE network attempts to perform handover to a legacy network, or if it is determined whether the UE is periodically or aperiodically established, the UE stops reception of a LTE signal from an eNode-B serving as a base station (BS) or measures a QoS of a legacy network signal. In this case, the legacy network may be any of communication networks (e.g., CDMA, WCDMA, GSM, etc.) other than the LTE network supported by the UE.

Generally, since the UE includes one transmission/reception (Tx/Rx) antenna, signal transmission/reception for one communication network must be temporarily stopped, such that signals of other communication networks can be measured while the UE communicates with one communication network. That is, if the UE wishes to perform handover while receiving a signal from the LTE network, or if required, the UE receives a signal from a legacy network (e.g., a CDMA enhanced High-Rate Packet Data (eHRPD) network) for about 6 ms, samples the received signal, and measures a quality of the received signal. In this case, eHRPD is a new version of 1xEV-DO upper layer protocol stack developed by the 3GPP2 standards committee so as to prepare for the wireless communication network interoperability for LTE.

In this case, signal transmission/reception with one communication network is temporarily stopped, such that correct time synchronization between processors (i.e., the LTE processor and the legacy processor) contained in the UE is required. Such correct time synchronization can prevent unnecessary data from being transmitted and received from and to the LTE network.

Figure 2:
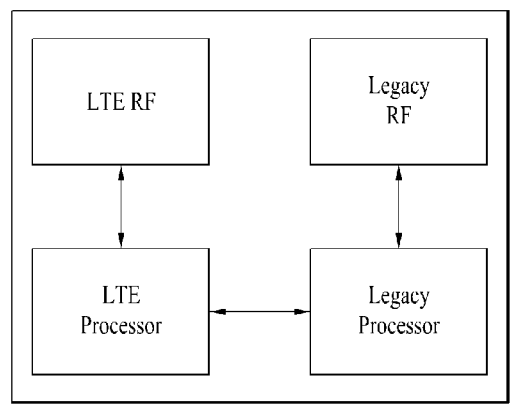
FIG. 2 is a block diagram illustrating a general dual modem device.

FIG. 2 is a block diagram illustrating a general dual modem device.

Referring to FIG. 2, the dual modem device includes a LTE RF module for transmitting and receiving an RF signal to and from the LTE network, and a LTE processor for processing a series of operations for communication with the LTE network. The dual modem device further includes a legacy RF module for transmitting and receiving an RF signal to and from the legacy network, and a legacy processor for processing a series of operations for communication with the LTE network.

In addition, the dual modem device includes a host interface for communication between two processors, and includes all communication interfaces from among host interfaces, for example, a Secure Digital Input Output (SDIO), a Universal Asynchronous Receiver/Transmitter (UART), an External Bus Interface (EBI), etc.

In addition, a general dual modem device includes one antenna for communicating with a LTE network or a legacy network. The antenna may be connected to the LTE RF module or the legacy RF module through a switch, a diplexer, or the like.

For convenience of description and better understanding of the present invention, a processor corresponding to a network currently connected to the UE will hereinafter be referred to as a master chip, and the remaining processors for processing inter-RAT measurement will hereinafter be referred to as slave chips.

Figure 3:
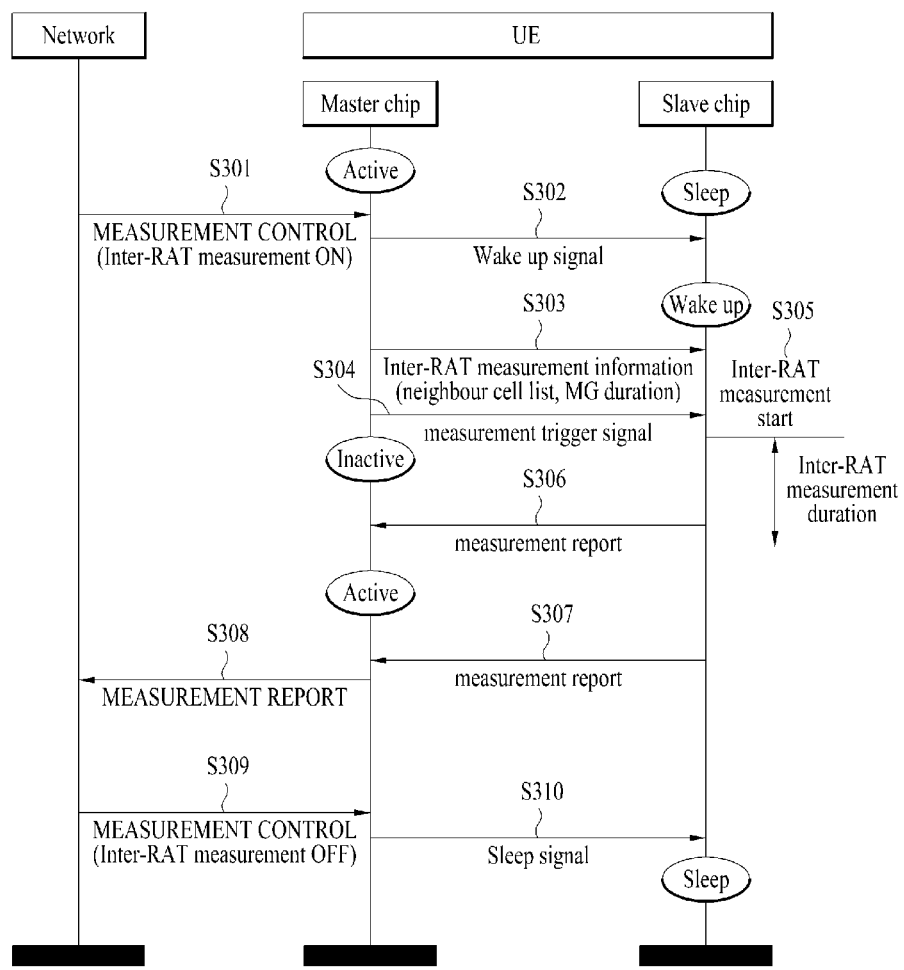
FIG. 3 is a flowchart illustrating a conventional method for processing inter-RAT measurement in a dual modem device.

FIG. 3 is a flowchart illustrating a conventional method for processing inter-RAT measurement in a dual modem device.

Referring to FIG. 3, the conventional inter-RAT measurement is largely classified into the following four steps 1) to 4). In the first step 1), upon receiving a measurement control message, a master chip controls a slave chip to be transitioned from a sleep mode to a wake-up mode. In the second step 2), an inter-RAT measurement signal is measured. In the third step 3), the inter-RAT measurement result is transferred to the network. In the fourth step 4), upon receiving the measurement control message, the master chip controls the slave chip to be transitioned to the sleep mode. Detailed descriptions of the first to fourth steps 1) to 4) will hereinafter be described with reference to the accompanying drawings.

For example, a master chip of an active status in which the master chip can transmit and receive a signal over a network receives a measurement control message including inter-RAT measurement parameters (e.g., RAT type, measurement gap start time, measurement gap duration, and the like) from a network to which the UE currently pertains (Step 301), and transmits a wake-up signal to the slave chip through a host interface (Step 302). In this case, the slave chip having received the wake-up signal is transitioned from the sleep mode (also called an idle mode) to the wake-up mode (also called a standby mode).

In addition, the master chip transmits measurement-associated parameters (e.g., neighbor cell list, measurement gap duration, and the like) to the slave chip so as to process the inter-RAT measurement (Step S303). The master chip transmits a measurement trigger signal for indicating the beginning of measurement to the slave chip (Step 304). The master chip having transmitted the measurement trigger signal is transitioned from an active status to an inactive status.

The slave chip receives the measurement trigger signal from a heterogeneous network instead of a current network during pre-received measurement gap duration, and measures the received signal (Step 305).

Subsequently, the slave chip informs the master chip of the collected inter-RAT measurement result (Steps 306 and 307). The master chip informs the currently connected network of the measurement result (Step 308). In this case, the master chip having received the inter-RAT measurement result is transitioned from an inactive status to an active status.

Finally, the master chip having received the inter-RAT measurement result receives a measurement control message for indicating completion of inter-RAT measurement from the network (step 309), and transmits a sleep signal to the slave chip such that the slave chip is transitioned from the wake-up mode to the sleep mode (step 310).

Meanwhile, if the slave chip begins to measure a signal because of the measurement trigger signal, the slave chip is transitioned from the sleep mode to the wake-up mode and requires processing timing due to a time delay caused by the execution of software for inter-RAT measurement, so that it is impossible to establish correct time synchronization between the master chip and the slave chip. In other words, although the master chip has not to perform transmission and reception of data during the inter-RAT measurement as shown in FIG. 1, there arise errors in timing so that the master chip may wrongly perform transmission and reception of data. Upon completion of the inter-RAT measurement, although the master chip has to transmit and receive a signal to and from the network, the master chip may not transmit and receive the signal to and from the network due to the timing error.

In order to solve the above-mentioned problems, the present invention may further include a method for establishing synchronization between the master chip and the slave chip in the above-mentioned inter-RAT measurement procedure. A detailed description thereof will hereinafter be described with reference to the accompanying drawings.

Figure 4:
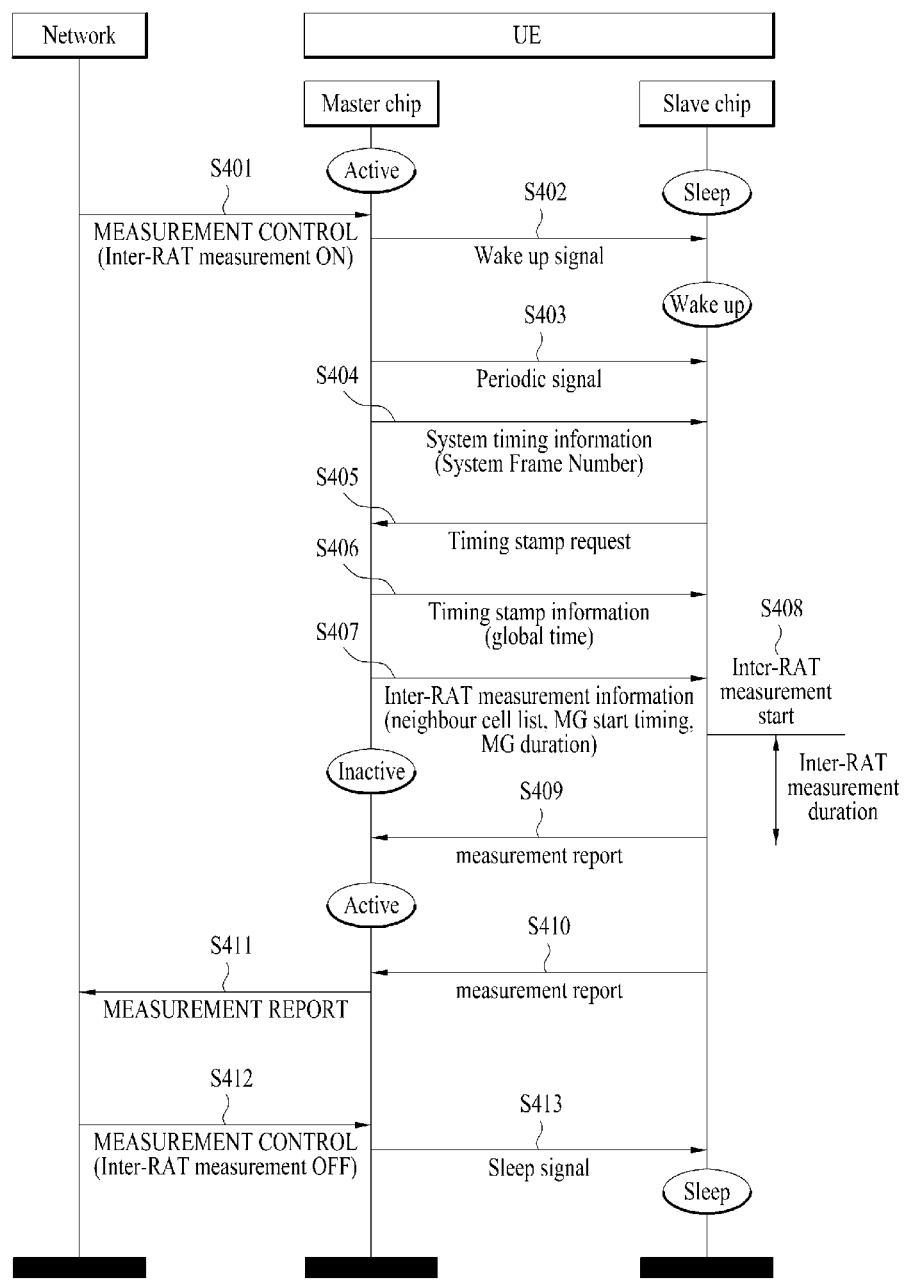
FIG. 4 is a flowchart illustrating a method for processing inter-RAT measurement in a dual modem device according to a first embodiment of the present invention.

FIG. 4 is a flowchart illustrating a method for processing inter-RAT measurement in a dual modem device according to a first embodiment of the present invention.

Referring to FIG. 4, the inter-RAT measurement procedure for use in the dual modem device according to a first embodiment of the present invention is largely classified into the following five steps 1) to 5). In the first step 1), upon receiving a measurement control message, a master chip controls a slave chip to be transitioned from a sleep mode to a wake-up mode. In the second step 2), time synchronization between the master chip and the slave chip is achieved. In the third step 3), an inter-RAT measurement signal is measured. In the fourth step 4), the inter-RAT measurement result is transferred to the network. In the fourth step 5), upon receiving the measurement control message, the master chip controls the slave chip to be transitioned to the sleep mode. Detailed descriptions of the first to fifth steps 1) to 5) will hereinafter be described with reference to the accompanying drawings.

For example, a master chip of an active status in which the master chip can transmit and receive a signal over a network receives a measurement control message including inter-RAT measurement parameters (e.g., RAT type, measurement gap start time, measurement gap duration, and the like) from a network to which the UE currently pertains (Step 401), and transmits a wake-up signal to the slave chip through a host interface (Step 402). In this case, the slave chip having received the wake-up signal is transitioned from the sleep mode (also called an idle mode) to the wake-up mode (also called a standby mode).

Subsequently, the master chip transmits a periodic signal to the slave chip so as to correct time synchronization encountered in the inter-RAT measurement procedure (Step 403). The periodic signal may be continuously transferred to the slave chip until the slave chip enters the sleep mode upon completion of the above-mentioned measurement. In addition, the master chip may transmit system timing information including a system frame number (SFN) to the slave chip (Step 404). The SFN may be used to indicate a frame start point of the master chip so as to establish synchronization between two chips (i.e., the master chip and the slave chip).

In accordance with the inter-RAT measurement procedure for the dual modem device according to the present invention, the slave chip transmits a timing stamp request signal to the master chip so as to achieve timing offset acquisition between both chips (step 405). In this case, the timing stamp request signal from the slave chip may command the master chip to determine synchronization or non-synchronization. In response to the timing stamp request signal, the master chip transmits timing stamp information to the slave chip (Step 406). The timing stamp information is characterized in that it includes information about a global time. The slave chip can determine whether synchronization between the master chip and the slave chip is correctly established using the global time information contained in the timing stamp information. If the slave chip determines the occurrence of incorrect synchronization between the master chip and the slave chip, the second processor calculates an offset value using the global time, the periodic signal, and the SFN, so that timing correction can be achieved.

Subsequently, the master chip transmits measurement-associated parameters (e.g., neighbor cell list, Measurement Gap start timing, Measurement Gap duration, and the like) to the slave chip so as to process inter-RAT measurement (Step 407). The master chip having transmitted the measurement-associated parameters is transitioned from the active status to the inactive status when a current time reaches a measurement gap start time. That is, the first embodiment of the present invention is characterized in that the inter-RAT measurement of the slave chip begins with reception of measurement-associated parameters not the measurement trigger signal.

The slave chip receives the measurement-associated parameters, and receives a signal from a heterogeneous network instead of a current network during pre-received measurement gap duration, and measures the received signal (Step S408).

Subsequently, the slave chip informs the master chip of the collected inter-RAT measurement result (Steps 409 and 410). The master chip informs the currently connected network of the measurement result (Step 411). In this case, the slave chip may periodically or aperiodically report the measurement result to the master chip. In addition, the master chip having received the inter-RAT measurement result is transitioned from the inactive status to the active status after the lapse of measurement gap duration.

Finally, the master chip having received the inter-RAT measurement result receives a measurement control message for indicating completion of inter-RAT measurement from the network (step 412), and transmits a sleep signal to the slave chip such that the slave chip is transitioned from the wake-up mode to the sleep mode (step 413).

The first embodiment of the present invention does not include the timing stamp function in the slave chip so that it can transmit/receive the timing stamp request and the timing stamp information so as to acquire additional timing offset. In contrast, the second embodiment of the present invention discloses that a timing stamp function is contained in the slave chip.

Figure 5:
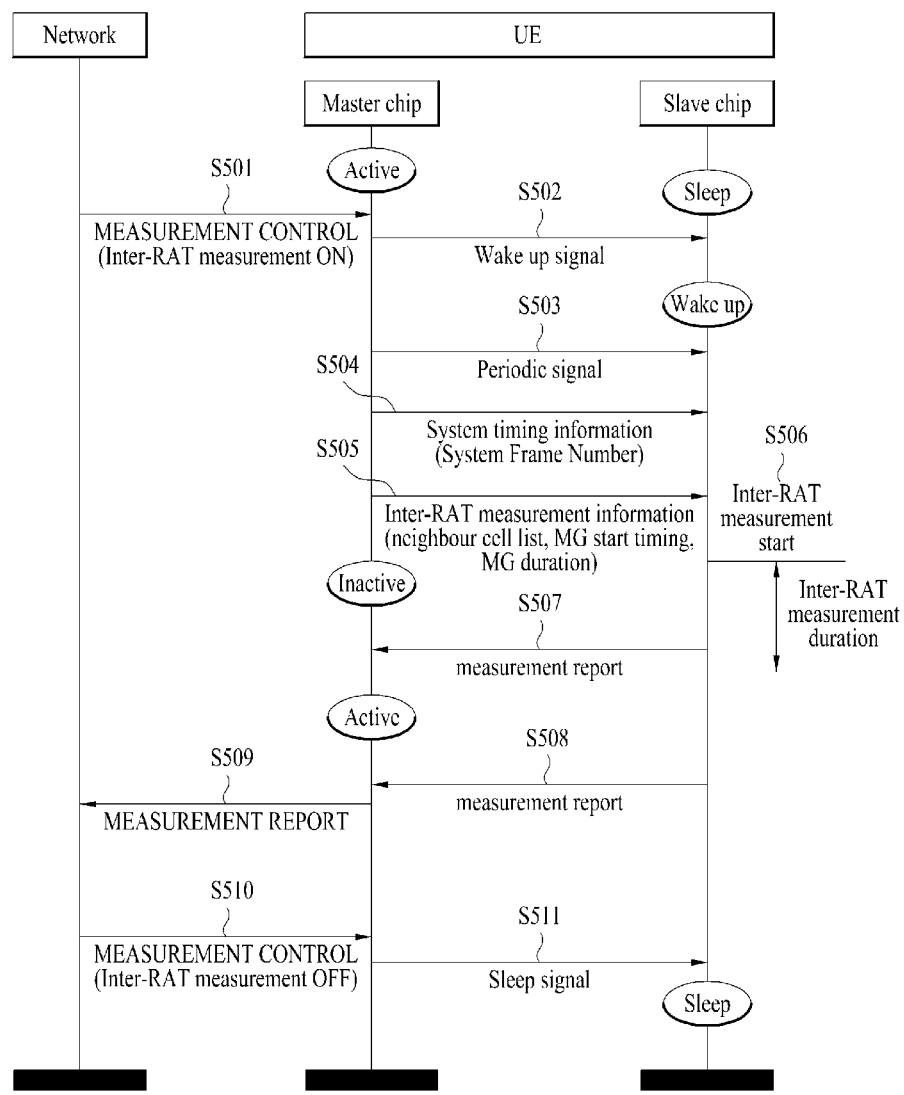
FIG. 5 is a flowchart illustrating a method for processing inter-RAT measurement in a dual modem device according to a second embodiment of the present invention.

FIG. 5 is a flowchart illustrating a method for processing inter-RAT measurement in a dual modem device according to a second embodiment of the present invention.

Referring to FIG. 5, the inter-RAT measurement procedure for use in the dual modem device according to a second embodiment of the present invention is largely classified into the following five steps 1) to 5). In the first step 1), upon receiving a measurement control message, a master chip controls a slave chip to be transitioned from a sleep mode to a wake-up mode. In the second step 2), time synchronization between the master chip and the slave chip is achieved. In the third step 3), an inter-RAT measurement signal is measured. In the fourth step 4), the inter-RAT measurement result is transferred to the network. In the fourth step 5), upon receiving the measurement control message, the master chip controls the slave chip to be transitioned to the sleep mode.

However, according to the aforementioned procedure 2) for establishing time synchronization between the master chip and the slave chip, the slave chip includes a timing stamp function, so that the slave chip can acquire timing offset between both chips using the period signal of the step 503 and the system timing information of the step 504. In other words, assuming that the timing stamp function is present in the slave chip, time synchronization between both chips can be correctly established using the period signal and the SFN.

Needless to say, as described above, the periodic signal can be continuously transferred until the slave chip is transitioned to the sleep mode upon completion of the measurement, so that the slave chip can continuously acquire time synchronization between both chips until the measurement procedure is completed. The remaining procedures 1), 3), 4) and 5) are identical to those of the first embodiment, and as such a detailed description thereof will herein be omitted for convenience of description.

As described above, the first or second embodiment of the present invention can minimize modification of a conventional modem chip and acquire timing synchronization between modem chips. Specifically, although the slave chip does not include the time stamp function, the master chip transmits timing stamp information using a global time to the slave chip, so that timing synchronization can be achieved.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

As apparent from the above description, the exemplary embodiments of the present invention have the following effects. The method and apparatus for processing inter-RAT measurement in a dual modem device according to the embodiments of the present invention can process inter-RAT measurement without deteriorating or severing Quality of Service (QoS) supplied from a currently connected communication network. In addition, the present invention can minimize modification of a conventional modem chip contained in the dual modem device and at the same time acquire time synchronization between modem chips.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing inter Radio Access Technology (inter-RAT) measurement in a mobile station (MS) equipped with a dual modem, the method comprising:
   receiving, by a first processor of the MS communicating with a first communication network, a measurement control signal including a parameter for signal measurement from the first communication network,
   wherein the parameter includes a measurement gap start time and a measurement gap duration;
   transmitting, by the first processor to a second processor of the MS, a wake-up signal;
   entering, by the second processor, a wake-up mode from a sleep mode;
   transmitting, by the first processor to the second processor, timing information based on a system frame number (SFN) and a global time;
   acquiring time synchronization for the inter-RAT measurement between the first processor and the second processor based on the system frame number (SFN) and the global time;
   transmitting the parameter from the first processor to the second processor;
   measuring, by the second processor, a signal of a second communication network using the parameter;
   receiving, by the first processor from the first communication network, a measurement control message for indicating a completion of the inter-RAT measurement;
   transmitting, by the first processor to the second processor, a sleep signal; and
   entering, by the second processor, the sleep mode from the wake-up mode.

2. The method according to claim 1, further comprising:
   transmitting a periodic signal for correcting time synchronization from the first processor to the second processor.

3. The method according to claim 2, wherein the measuring of the signal includes:
   calculating a timing synchronization offset between the first processor and the second processor using at least one of the timing information based on the global time, the system frame number (SFN), and the periodic signal; and
   correcting time synchronization between the first processor and the second processor using the timing synchronization offset.

4. The method according to claim 2, wherein the first processor transmits a periodic signal for correcting time synchronization until the inter-RAT measurement is completed.

5. The method according to claim 4, wherein the first processor stops transmitting and receiving data to and from the first communication network until the inter-RAT measurement is completed.

6. A mobile station equipped with a dual modem, the mobile station comprising:
   a first processor configured to communicate with a first communication network; and
   a second processor configured to communicate with a second communication network,
   wherein the first processor is further configured to:
      receive a measurement control signal including a parameter for signal measurement from the first communication network,
      transmit a wake-up signal to the second processor,
      transmit timing information based on a system frame number and a global time to the second processor,
      receive, from the first communication network, a measurement control message for indicating a completion of the inter-RAT measurement, and
      transmit a sleep signal to the second processor,
   wherein the second processor is further configured to:
      enter a wake-up mode from a sleep mode,
      acquire time synchronization for inter Radio Access Technology (inter-RAT) measurement between the first processor and the second processor based on the system frame number (SFN) and the global time,
      upon receiving the parameter from the first processor, measure a signal of the second communication network using the parameter, and
      enter the sleep mode from the wake-up mode, and
   wherein the parameter includes a measurement gap start time and a measurement gap duration.

7. The mobile station according to claim 6, wherein the first processor is configured to transmit a periodic signal for correcting time synchronization to the second processor.

8. The mobile station according to claim 7, wherein the second processor is configured to:
   calculate a timing synchronization offset between the first processor and the second processor using at least one of the timing information based on the global time, the system frame number (SFN), and the periodic signal, and
   correct time synchronization between the first processor and the second processor using the timing synchronization offset.

9. The mobile station according to claim 6, wherein the first processor is configured to transmit a periodic signal for correcting time synchronization until the inter-RAT measurement is completed.

10. The mobile station according to claim 9, wherein the first processor is configured to stop transmitting and receiving data to and from the first communication network until the inter-RAT measurement is completed.

* * * * *